UNITED STATES PATENT OFFICE.

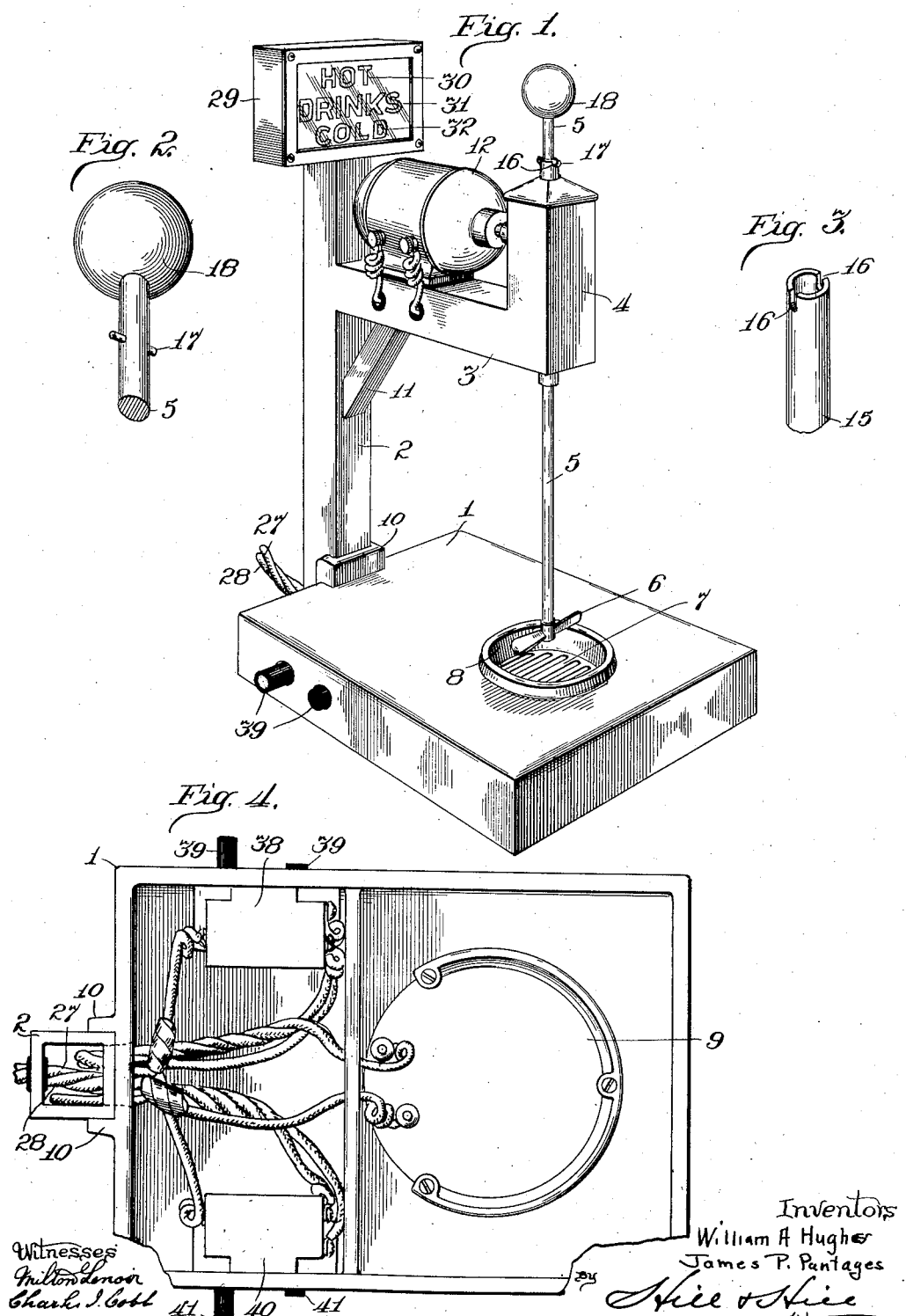

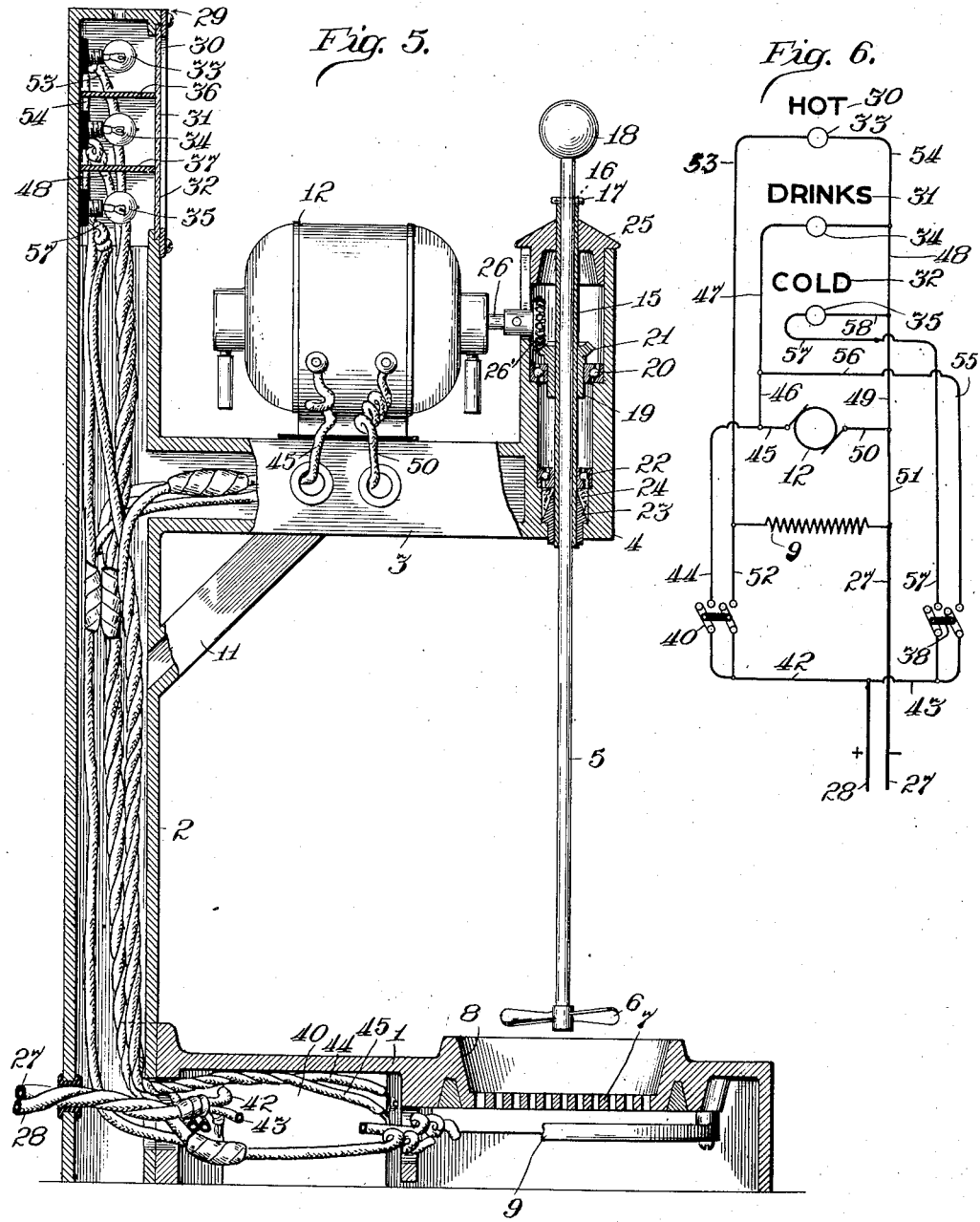

WILLIAM A. HUGHS AND JAMES P. PANTAGES, OF CHICAGO, ILLINOIS.

BEVERAGE-MIXING DEVICE.

1,318,152.   Specification of Letters Patent.   Patented Oct. 7, 1919.

Application filed November 10, 1917. Serial No. 201,269.

*To all whom it may concern:*

Be it known that we, WILLIAM A. HUGHS and JAMES P. PANTAGES, citizens of the United States, residing at Chicago, in the county of Cook and State of Illinois, have jointly invented certain new and useful Improvements in Beverage-Mixing Devices, of which the following is a description.

Our invention belongs to that general class of devices known as mixers and particularly to a device suitable for the mixing or preparation of hot and cold beverages, it being understood, however, that the same may be used wherever found applicable. The invention has among its objects the production of a device of the kind described that is simple, convenient, efficient, ornamental, compact, economical and satisfactory. It has particularly as an object the production of a beverage mixer suitable for the mixing of both hot and cold drinks. It has among its further objects the production of a device so arranged that the same will be sanitary. Many other objects and advantages of the construction herein shown and described will be obvious to those skilled in the art from the disclosure herein made.

To this end our invention consists in the novel construction, arrangement and combination of parts herein shown and described and more particularly pointed out in the claims.

In the drawings, wherein like reference characters indicate like or corresponding parts, Figure 1 is a perspective view of our preferred form of device;

Fig. 2 is a perspective view of the upper end of the stirrer shaft;

Fig. 3 is a perspective view of the upper end of the driving sleeve therefor;

Fig. 4 is a plan view of the under side of the base;

Fig. 5 is a sectional view of the device; and

Fig. 6 is a diagrammatic view of the electrical connections.

Heretofore it has been customary in mixing hot drinks to heat the drink or some of the constituents thereof either before or after the mixing, usually before, or to add hot water or milk to the drink. This has several disadvantages, among them the production of an inferior drink and another the expense in keeping water or other constituents hot at all times so that there may be no delay in serving the customer when the drink is called for. With our apparatus the drink may be prepared or compounded and then heated, and at the same time mixed or stirred, or ingredients may be put in while heating and mixing. The same is economical in that the heat is only employed during the time the drink is being mixed, the heating being simultaneous with the mixing, so that there is no loss of time in serving the customer. In addition, if a cold drink is desired, there is no waste of heat or materials not used as the drink may be mixed cold with the same apparatus. In addition to the foregoing there is no grit or oil drippings from the motor or source of power driving the mixer or stirrer. We also provide means for indicating whether the drink is mixed hot or cold, that is, how the apparatus is operated, which not only serves as an indication to the operator but also serves to advertise the user of the apparatus and call attention to his modern and improved apparatus.

Referring to the drawings, 1 represents a base of suitable size, shape and material provided with a standard 2 carrying a cross part 3 extending over the base. Part 3 is preferably provided with a vertically extending part 4 from which depends the rotatable stirring or mixing shaft 5, carrying at its lower end the paddles or stirrers 6. The base is provided with a receptacle support 7, the same being arranged at the bottom of the recess 8 in the base and so that the receptacle or vessel (not shown) containing the beverage may be centered relative the mixer and maintained in position. The support 7 is preferably provided with openings therethrough as most clearly shown in Fig. 1, as well as Fig. 5, and below the same is arranged a heating element represented by the numeral 9. We prefer to employ an electric heater because of its compactness, simplicity, safety and ease of control.

The base 1 is shown provided with the lugs 10 arranged to brace the standard 2, and a brace 11 is shown for bracing the extended part 3, which carries the source of power, in the case illustrated an electric motor 12 which is operatively connected with the shaft 5. As most clearly shown in Fig. 5, we provide a sleeve 15 through which the shaft 5 extends, the shaft being slidable in the sleeve so that the shaft may be raised to clear the container or vessel supported on the plate 7. However, suitable means is provided for connecting the sleeve and shaft when the shaft is lowered, so that as the sleeve is driven the shaft will also be driven. A simple construction is to provide notches 16 in the end of the sleeve 15 and the pin or lugs 17 on the shaft 5, the shaft being provided with a handle part 18 if desired for convenience in raising and lowering. Secured to the sleeve is a collar 19 constructed with the teeth 21, the same constituting a gear. The collar and sleeve 5 are supported and maintained in place by the bearings 20 and 22. These are supported on shoulders on the interior of the part 4. However, we provide a member 23 and suitable packing 24, as shown, which forms a substantially tight joint about the sleeve and prevents leakage of oil or passage of grit down the shaft and sleeve. It will be noted that member 23 is arranged so that any oil passing through the bearings will drain away from the sleeve. A cap 25 carried at the top steadies the sleeve and to some extent serves as a bearing. However, the anti-friction bearings described permit a substantially loose fit of the sleeve and cap 25. The sleeve is driven from the motor shaft 26 by a bevel pinion 26' meshing with the pinion 21.

On the standard 2 we preferably mount an indicator consisting of the casing part 29 having a glass or similar front upon which are shown the words "Hot", "Drinks", "Cold", as indicated by the reference characters 30, 31 and 32 respectively. Arranged within the casing part 29 are electric lamps 33, 34 and 35, partitions 36 and 37, however, being arranged between the lamps as most clearly shown in Fig. 5.

The device described is electrically operated and conducting cables 27 and 28 extend to a suitable source of electrical supply. Means, however, is provided for controlling the apparatus in its operation so that the motor may be driven alone and at the same time its operation indicated by the words "Drinks Cold" being illuminated. However, if desired, the motor may be driven and the heating means employed in conjunction therewith, the operation of the device at the same time being shown by the illumination of the words "Hot Drinks". To control the operations, we provide a switch 38 of suitable form, as illustrated the same having control buttons 39. We also provide a switch 40 which has similar buttons 41. The switches shown are of well known construction, consequently we do not consider it necessary to illustrate and describe the same in detail as any equivalent may be employed.

Obviously the method of wiring the various parts may be modified to a considerable extent, but for illustration we show, however, diagramtically in Fig. 6 our preferred arrangement. Referring to Fig. 6, one of the wires as shown 28 is connected by the conductors 42 and 43 to the switches 40 and 38. Switch 40 is connected by the conductors 44—45 with the motor 12, and the motor 12 is connected by the conductors 50 and 51 with the conductor 27. We have also shown conductor 44 connected by the conductors 46—47 with the lamp 34, arranged to illuminate the word "Drinks", this being also connected by the conductors 48 and 49 to conductor 51 which is connected with 27. Switch 40 also controls the heater 9, and 52 represents a wire connected with the heater 9, and 53 a wire connecting the lamp 33 arranged to illuminate the word "Hot". The lamp 33 is connected by conductor 54 with conductor 48. Switch 38 is connected by conductors 55 and 56 with the conductor 46, which is connected with the motor 12 and the lamp 34 and by means of conductor 57 with the lamp 35, this being connected by conductor 58 and the intermediate wiring with conductor 27. Obviously when switch 40 is closed the motor operates, the heater operates, and the words "Hot Drinks" are illuminated. If switch 38 is operated the motor alone is operated and the words "Drinks Cold" illuminated. As mentioned the diagram of wiring shown in Fig. 6 is merely illustrative in order that the operation of the device may be clearly understood, it being possible for a skilled electrician to re-arrange and vary the circuits to give the same results.

As before mentioned a beverage or drink of unusual and superior quality may be quickly and easily prepared by means of our apparatus. Likewise, owing to the particular method of driving the shaft 5 and the arrangement of the parts, there is but slight chance for lubricating oil or grit to drip down into the beverage.

Having thus described our invention, it is obvious that various immaterial modifications may be made in the same without departing from the spirit of our invention, hence we do not wish to be understood as limiting ourselves to the exact form, construction, arrangement and combination of parts herein shown and described or uses mentioned.

What we claim as new and desire to secure by Letters Patent is:—

1. In a mixing device of the kind described and in combination, a base having a recess in its top face and provided with a standard at one side having an arm extending centrally over said recess, a stirrer shaft depending from said arm central said recess, a sleeve arranged about said shaft and carried by said arm, a motor arranged on said arm with its shaft extending at an angle to said sleeve, means for operatively connecting said motor shaft and sleeve, said stirrer shaft slidably arranged in said sleeve and provided with means for engaging the sleeve when the stirrer shaft is in mixing position over said recess, a heating element arranged within the base adjacent said recess, means for controlling said motor and heating element, whereby the motor may be operated independently or in conjunction with said heating element, and means for indicating the simultaneous operation of the motor and the heating element.

2. In a mixing device of the kind described and in combination, a base having a recess in its top and provided with a standard at one side having an arm extending centrally over said recess, a stirrer shaft depending from said arm central said recess, a sleeve arranged about said shaft and carried by said arm, a motor arranged on said arm with its shaft extending at an angle to said sleeve, means for operatively connecting said motor shaft and sleeve, said stirrer shaft slidably arranged within the sleeve and provided with means for engaging the same when the stirrer shaft is in mixing position over said recess, a heating element arranged within the base adjacent said recess, means for controlling said motor and said heating element, whereby the motor may be operated independently or in conjunction with said heating element, and indicating means operably connected with the motor and with the heating means, whereby when the motor is operated alone the indicating means will automatically show the same, and when the motor and heating element are operated simultaneously, the indicating means will also automatically show the same.

3. In a mixing device of the kind described and in combination, a base arranged to support a receptacle and provided with a standard at one side having an arm extending centrally over said recess, a stirrer shaft depending from said arm central said recess, a sleeve arranged about said shaft and carried by said arm, a motor carried by the device provided with a shaft extending at an angle to said sleeve, means for operatively connecting said motor shaft and sleeve, said stirrer shaft slidably arranged within said sleeve and provided with means for engaging the sleeve when the stirrer shaft is in mixing position over the base, a heating element arranged within the base adapted to heat a receptacle placed thereon, controlling mechanism for said motor alone and for said motor and heating element combined, whereby the motor may be operated independently or in conjunction with said heating element, indicating means, and co-operating connections between the controlling means for the motor and one portion of the indicating means, whereby upon starting the motor the fact that the motor alone is operating will be indicated, and connecting means between the controlling means for the motor and heating element combined, whereby upon starting the motor and the heating element, the same will be automatically indicated.

4. In a device of the kind described, a base arranged to support a receptacle thereon, provided with an electric heater in proximity thereto arranged to heat the receptacle and contents, said base provided with a standard at one side having an arm extending centrally thereover, an electric motor carried by the arm, in combination with a rotatable sleeve supported in proximity to the motor, connecting mechanism between the motor and the sleeve, a shaft slidably mounted in the sleeve, means for operatively connecting the shaft and the sleeve as the arm reaches its operable position, indicating means, an electric circuit controlled by a switch, whereby the starting of the motor will be duly indicated on the indicator, and an electric circuit connected with the motor and the heating element, said circuit likewise being controlled by a switch, whereby upon connecting said circuit, the motor and heater will both be in operation and likewise indicated on the indicator.

In testimony whereof we have hereunto signed our names in the presence of two subscribing witnesses.

WILLIAM A. HUGHS.
JAMES P. PANTAGES.

Witnesses:
  Roy W. Hill,
  Charles I. Cobb.